Sept. 28, 1965  SHOGO SHIRAI  3,209,146
APPARATUS FOR ADJUSTING POSITION OF A SAMPLE
FOR ELECTRON PROBE X-RAY MICROANALYZER
Filed Dec. 10, 1962

INVENTOR
SHOGO SHIRAI

BY Woodhams, Blanchard & Flynn
ATTORNEYS

United States Patent Office 3,209,146
Patented Sept. 28, 1965

3,209,146
APPARATUS FOR ADJUSTING POSITION OF A SAMPLE FOR ELECTRON PROBE X-RAY MICROANALYZER
Shogo Shirai, Kawasaki-shi, Japan, assignor to Kabushiki Kaisha Akashi Seisakusho, Tokyo, Japan
Filed Dec. 10, 1962, Ser. No. 243,250
Claims priority, application Japan, Dec. 9, 1961, 36/44,154
1 Claim. (Cl. 250—49.5)

This invention relates to an apparatus for adjusting the position of a sample in an electron probe X-ray microanalyzer.

An electron probe X-ray microanalyzer is an instrument for analyzing the elements in a microportion of a sample by bombarding the portion of the sample with an extremely narrow electron beam and by detecting the wave lengths and intensity of the characteristic X-rays emitted from the bombarded portion.

However, in order to make it possible to apply the electron beam to the portion of the sample required to be analyzed, such measures as assembling an objective lens of an optical microscope between the magnetic poles of the electron beam condenser lens or shifting the sample between the electron lens system and the optical microscope, etc., have heretofore been adopted. That is to say, in the former, both the objective lens of the optical microscope and a reflecting mirror used for diffraction of the optical axis at a right angle so that observations may be made from one side, are disposed on the axis of the electron beam; and the electron beam is applied to the surface of the sample through the apertures perforated in the lens and its reflecting mirror. However, this system can not be well designed to meet the requirements due to various restrictions resulting from the complicated structure of the part immediately in front of the sample which necessitates electron-optically accurate construction. Also, in the latter, the electron optical system and the optical microscope are separately fixed in their respective positions; and the sample is moved so that the point observed by the microscope may be moved into alignment with electron beam. This system, however, requires that the sample be accurately shifted a predetermined distance, which distance may be quite small, such as, for example, 1μ. It is very difficult to manufacture a shifting mechanism capable of meeting this requirement. According to the present invention, as will be explained hereinafter in detail, the disadvantages mentioned above are eliminated, and the position of the sample can be readily and accurately adjusted.

Figure 1:
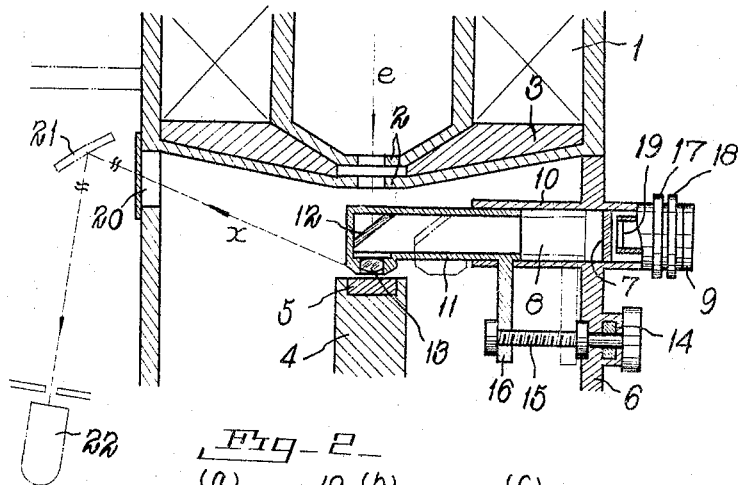
Figure 2:
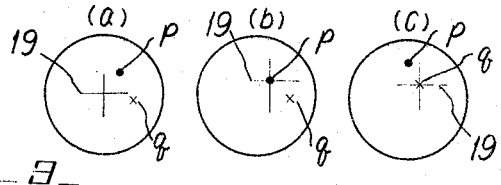
Figure 3:
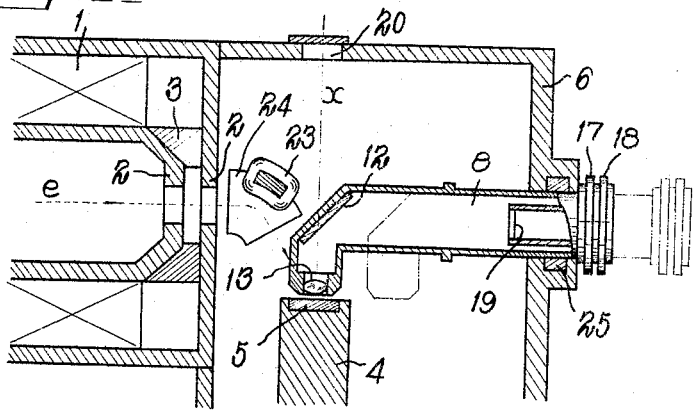

The object of this invention will be more readily understood with reference to the accompanying drawings wherein:

FIG. 1 is a longitudinal sectional view of the principal portion of one embodiment according to this invention;

FIGS. 2(a), 2(b) and 2(c) are schematic drawings for explaining a method of adjusting the position of the specimen for analysis by means of the apparatus according to this invention; and FIG. 3 is a longitudinal sectional view of the principal portion of another embodiment according to this invention.

Now, referring to FIG. 1 in which one embodiment of this invention is shown, the space between the magnetic poles 2 and 2 which are excited by coil 1 is sealed with a non-magnetic substance 3, and an electron beam condenser lens is disposed therebetween. The electron beam $e$ which is emitted from the electron-gun (not shown) installed above this lens and once condensed by a first condenser lens will focus upon the surface of a sample 5 fixed on a sample stage 4. A vacuum wall 6 is fitted with a glass window 7, the outside of which is fitted with an eye piece cylinder 9 of an optical microscope. Inside of the guide cylinder 10 fixed to the wall 6, is movably fitted an objective lens cylinder 11. When the lens cylinder 11 is moved out from the guide cylinder 10, the end of the cylinder 11 is inserted between the electron-beam condenser lens and the sample 5. The end of this lens cylinder 11 is fitted with a reflecting mirror 12, and also is fitted with an objective lens 13 to which opens through the side thereof and faces toward the sample 5. A rotatable threaded rod 15 extends through the vacuum wall 6 and is encircled by a packing 14. An arm 16, which is fixed to the bottom side of the lens cylinder 11 and extends through a groove in the guide cylinder 10, is threadedly engaged with the said threaded rod 15. Inside of the eye piece cylinder 9, there is provided a sight index 19, such as a cross wire, the position of which is adjustable by means of knobs 17 and 18. Therefore, by rotating the rod 15, the objective lens cylinder 11 can be shifted between the positions shown in solid lines and dotted lines. In use, after the objective lens cylinder 11 has been shifted to the position indicated by dotted lines, when the sample is bombarded by the electron beam, contaminants in the vacuum chamber, for example, oil vapor of the vacuum pump or fine organic substance floating inside of the chamber, is baked by the beam to form contaminations at the point where the beam strikes the sample. Next, by shifting the lens cylinder 11 to a suitable position as indicated by the solid lines, it is possible to observe the surface of the sample. In this condition, as shown in FIG. 2(a), the sight index 19 and the abovementioned contamination $p$ can be observed at positions independent of each other, and at the same time, a desired point $q$ on the sample can be selected for analysis. By adjusting the knobs 17 and 18 to coincide the sight index 19 with the contamination $p$ as shown in FIG. 2(b), and further by adjusting a sample microshifting device (not shown in the drawing) of the sample stage 4 to bring the point for analysis $q$ into coincidence with the sight index 19, the point for analysis can be positioned at a position where the contamination $p$ was located prior to this adjustment. The point $q$ is then in alignment with the electron beam $e$. Then, after the lens cylinder 11 has been shifted to the original position as indicated by the dotted line, the point $q$ will be bombarded with the electron beam. Therefore, by taking off the X-rays $x$ generated from the point $q$ by the electron bombardment through window 20; and then allowing the X-rays to strike a spectroscopic crystal 21, and by detecting the diffracted X-rays by means of a detector 22, it is possible to measure the wave lengths of X-rays on the basis of the incident angle of X-rays to the crystal 21.

Now, referring to FIG. 3 in which another embodiment of this invention is shown, coil 1 and magnetic poles 2—2 are the same as that of FIG. 1. Next to the electron beam condenser lens formed with the magnetic poles 2—2, there is provided a pair of fan-shaped magnetic poles 24 which are excited by a coil 23 and which are disposed in parallel relationship and on opposite sides of the electron beam $e$. Further, the observation surface of the sample 5 fixed upon the sample stage 4 is disposed in parallel with the magnetic lines of force produced by the magnetic poles 24 and not at a right angle to but rather in parallel with the magnetic poles 2—2. Accordingly, the electron beam $e$, when passing through the space between the magnetic poles 24, is deflected and impinges on the surface of the sample, for example, at an angle of 70 degrees, and is focused at a selected point thereon. The X-rays $x$ emitted from this incident point are taken off through the window 20, at a right angle to the observation surface, and then impinge on the spectroscopic crystal (not shown) as in the previously described embodiment. Further, inside of the vacuum wall 6, there is movably inserted an optical microscope 8 encircled by a packing 25 and disposed at a position approximately facing toward the electron beam condenser lens. The end of the microscope is fitted with a reflecting mirror 12. The axis of the objective lens 13 and the axis of the eye piece are at right angles to each other. By shifting the said microscope toward the interior of the vacuum chamber to the position shown in solid lines, the lens 13 is brought into a position facing toward the sample so that the surface thereof may be observed. On the other hand when the microscope 8 is drawn outwardly to the position thereof shown in broken lines, the electron beam e impinges on the sample 5 and the emitted X-rays impinge on the analyzing crystal without being intercepted by the microscope. Inside of the microscope cylinder, there is provided a sight index 19, the position of which can be adjusted by knobs 17 and 18. Therefore, in this type of apparatus, by bombarding the sample with the electron beam after the microscope 8 has been shifted to the position indicated by the dotted lines, a contamination can be marked at the incident point of the electron beam, and thereafter by adjusting the sight index 19 and micro-shifting the sample after the microscope has been shifted to the position indicated by the solid lines, it is possible to shift the point for analysis to the position of incidence of the electron beam e. According to this apparatus, the X-rays are taken off at a right angle to the surface of the sample and, by deflecting the electron beam immediately in front of the sample, the front surface of the sample is opened in a comparatively wider range so the microscope can be readily fitted.

As explained hereinabove, according to the apparatus of this invention, the objective lens of the optical microscope is shifted to a position facing toward the sample only when observing the surface of the sample, and when the X-rays are being detected, the lens is moved away from the sample. Accordingly, when the sample is being bombarded by the electron beam the optical microscope does not interfere with the beam and, therefore, it has no harmful influence upon the electron optical system in the vicinity of the electron beam. The assembly of the apparatus is easily made and also the construction of the lens pole portion is simple. Moreover, since the microscope can accurately analyze the desired position only by holding it so as not to shift while adjusting the position of the sample and the positions of the microscope before and after the shifting of the sample are not dependent on the position of the sample for analysis, construction of the shifting mechanism of the microscope can be easily made. In addition, since the objective lens can be used only at a specific position where it faces toward the sample, for example, as shown in FIG. 1, it is possible to fix the eye piece outside of the vacuum wall, and independently shift only the objective lens within the wall, and therefore the vacuum can be easily maintained.

What I claim is:

In an electron probe X-ray microanalyzer, the combination comprising:

wall means defining a vacuum chamber;

means on said wall means defining lens means for focusing an electron beam into said chamber;

a specimen support stage disposed in the vacuum chamber for supporting a specimen so that the electron beam focuses at a first point thereon, said stage being spaced from said lens means and being adjustable transversely to the axis of the beam;

an optical microscope including a housing carrying an objective lens, an eye piece and a mirror therebetween, the axis of the objective lens being substantially perpendicular to the axis of said eyepiece and substantially parallel to the axis of the electron beam, said objective lens and mirror being inside said chamber and said eye piece being at least partially outside of said chamber, said housing being mounted on and extending through said wall means and having an inner portion suporting said objective lens and mirror movable with respect to said wall means in a direction toward and away from said beam so that said objective lens and mirror can be moved to a first position disposed between said lens means and said stage, with said objective lens facing and adjacent the specimen on said stage, and a second position in which said housing supporting said objective lens and mirror is spaced from said beam so that said beam can pass between said lens means and said stage without obstruction by said housing supporting said objective lens and mirror;

adjustment means mounted upon said wall means and connected to said inner portion of said housing for effecting said movement thereof; and adjustable index means in said eye piece for locating said first point on the specimen supported upon said stage, whereby the specimen can be shifted with said stage so that a preselected second point on said specimen can be positioned under said index means and thereby located at the focal point of the electron beam.

References Cited by the Examiner

UNITED STATES PATENTS

| 2,405,306 | 8/46 | Hillier et al. | 250—49.5 |
| 2,439,644 | 4/48 | Bachman | 250—49.5 |
| 2,908,821 | 10/59 | Schumacher | 250—51.5 |
| 2,944,172 | 7/60 | Opitz et al. | 250—49.5 |

RALPH G. NILSON, *Primary Examiner.*